United States Patent
Tsai et al.

(10) Patent No.: US 9,282,658 B1
(45) Date of Patent: Mar. 8, 2016

(54) ASSEMBLY STRUCTURE FOR USE IN STORAGE MEDIA OF SERVER

(71) Applicant: AIC INC., Taoyuan Hsien (TW)

(72) Inventors: Lin-Kuei Tsai, Taoyuan Hsien (TW); Fu-An Jhang, Taoyuan Hsien (TW)

(73) Assignee: AIC INC., Taoyuan Hsien (TW)

( * ) Notice: Subject to any disclaimer, the term of this patent is extended or adjusted under 35 U.S.C. 154(b) by 75 days.

(21) Appl. No.: 14/477,939

(22) Filed: Sep. 5, 2014

(51) Int. Cl.
| | |
|---|---|
| *H05K 7/00* | (2006.01) |
| *H05K 5/02* | (2006.01) |
| *G11B 33/02* | (2006.01) |
| *H05K 7/14* | (2006.01) |
| *H05K 5/00* | (2006.01) |
| *H05K 5/03* | (2006.01) |

(52) U.S. Cl.
CPC ............ *H05K 5/0217* (2013.01); *G11B 33/022* (2013.01); *H05K 5/0004* (2013.01); *H05K 5/0221* (2013.01); *H05K 5/0226* (2013.01); *H05K 5/0247* (2013.01); *H05K 5/03* (2013.01); *H05K 7/1487* (2013.01)

(58) Field of Classification Search
CPC ........... H05K 7/16; H05K 7/18; G11B 33/027
USPC .................................................. 361/679.33
See application file for complete search history.

(56) References Cited

U.S. PATENT DOCUMENTS

| | | | | |
|---|---|---|---|---|
| 5,828,546 | A * | 10/1998 | Tirrell ................. | H05K 7/1409 361/679.39 |
| 7,492,607 | B2 * | 2/2009 | Nguyen ............... | H05K 7/1411 312/223.2 |
| 8,023,259 | B2 * | 9/2011 | Lam ...................... | G06F 1/1616 292/253 |
| 8,526,191 | B2 * | 9/2013 | Peng ................... | G11B 33/124 206/701 |
| 9,176,546 | B2 * | 11/2015 | Chen ...................... | G06F 1/187 |
| 2006/0171110 | A1 * | 8/2006 | Li ........................... | G06F 1/184 361/679.37 |
| 2007/0014085 | A1 * | 1/2007 | Meserth .................. | G06F 1/184 361/679.35 |
| 2011/0267766 | A1 * | 11/2011 | Wu ......................... | G06F 1/187 361/679.37 |

* cited by examiner

*Primary Examiner* — Anthony Q Edwards
(74) *Attorney, Agent, or Firm* — Chun-Ming Shih; HDLS IPR Services

(57) ABSTRACT

An assembly structure for use in a storage media of server includes: a base, formed with an accommodation space for accommodating a storage media; and a rotary cover plate, one end thereof is rotatably pivoted on the base, and the rotary cover plate includes a top plate, a push plate and a force plate. The push plate and the force plate are oppositely arranged at two sides of the top plate. The rotary cover plate is able to be engaged relative to the base thereby enabling the force plate to push the storage media for being electrically connected to the base, or to be opened relative to the base thereby enabling the push plate to push the storage media for being disconnected with the base. Accordingly, the storage media is enabled to be easily assembled or detached.

10 Claims, 9 Drawing Sheets

ASSEMBLY STRUCTURE FOR USE IN STORAGE MEDIA OF SERVER

BACKGROUND OF THE INVENTION

1. Field of the Invention

The present invention relates to an assembly structure, especially to an assembly structure for use in a storage media of a server.

2. Description of Related Art

With the network being more prevalent and the network bandwidth being wider, the data process which used to be done in a computer now can be achieved via the network. Because the application of network is commonly seen in our daily lives, a special case is the cloud computing which has been very popular in recent years and the cloud computing is capable of sharing software, hardware resources and various type of information via the mutual connection through network. The cloud computing utilizes the high-speed calculation and massive storage capability of a server group through the internet thereby being able to replace the software which has been installed in a personal computer or replace the hard disk drive for allowing the data to be accessed via the internet.

At present, a computer server is categorized into a vertical-type server and a frame-type server, the appearance of the vertical-type server is similar to a general personal computer, and a greater expansion space is provided during operation and the quantity of hard disk drives or other electronic devices can be adjusted according to user's requirements. In the frame-type server, the internal accommodation space of a machine case is able to be distributed, so the frame-type server can be easily removed from a frame for replacement. Generally speaking, the frame used for installing the frame-type server is able to be installed with a plurality of frame-type servers, so the frame-type server is more suitable to be applied in a large-scale machine room thereby being commonly adopted in a large-scale customer data center.

For satisfying different requirements of customer data, one or more hard disk drives may be frequently assembled in or detached from the large-scale data center. In prior art, the hard disk drive fastening rack adopted in a server frame is divided into several chassis kits with respect to the specification of the server for allowing one or more hard disk drive modules to be installed. For example: for a server with 1 U specification, the interior of the hard disk drive fastening rack is divided into a plurality of chassis kits along single direction so as to be formed as a 1×4 or 1×5 hard disk drive fastening rack. For a server with 2 U or higher specification, the plurality of chassis kits divided in the hard disk drive fastening rack are arranged with a layered means in the hard disk drive fastening rack so as to be formed as a 2×3, 2×4 or 3×5 hard disk drive fastening rack.

However, the mentioned chassis kits all require at least a hand tool, screw(s) or special tool for fastening the hard disk drive onto the frame. As such, inconvenience is cause during assembling or detaching the hard disk drive.

Accordingly, the applicant of the present invention has devoted himself for researching and inventing a novel design for improving the above-mentioned disadvantages.

SUMMARY OF THE INVENTION

The present invention is to provide an assembly structure for use in a storage media of server, so a storage media can be easily assembled or detached through a rotary cover plate being closed or opened.

Accordingly, the present invention provides an assembly structure for use in a storage media of server, allowing a storage media to be assembled in or detaching from a frame. The assembly structure includes a base and a rotary cover plate. The base is formed with an accommodation space and installed on the frame for accommodating the storage media. One end of the rotary cover plate is rotatably pivoted on the base. The rotary cover plate includes a top plate, a push plate and a force plate. The push plate and the force plate are oppositely arranged at two sides of the top plate. The rotary cover plate is able to be engaged relative to the base thereby enabling the force plate to push the storage media for being electrically connected to the base. The rotary cover plate is able to be opened relative to the base thereby enabling the push plate to push the storage media for being disconnected with the base.

Advantages achieved by the preset invention are as followings: a user can easily assemble or detach the storage media without any hand tool, so the operation is very simple and high efficiency is provided; especially, through the rotary cover plate being engaged or opened, the storage media is enabled to be connected or disconnected with (separated from) a base connector of the base.

DETAILED DESCRIPTION OF THE INVENTION

Preferred embodiments of the present invention will be described with reference to the drawings.

The present invention provides an assembly structure for use in a storage media of server which allows a storage media to be easily assembled and detached. The storage media is preferably to be a hard disk drive or a solid state drive (SSD), and what shall be addressed is that the scope of the present invention is not limited to the hard disk drive or the solid state drive.

Figure 1:
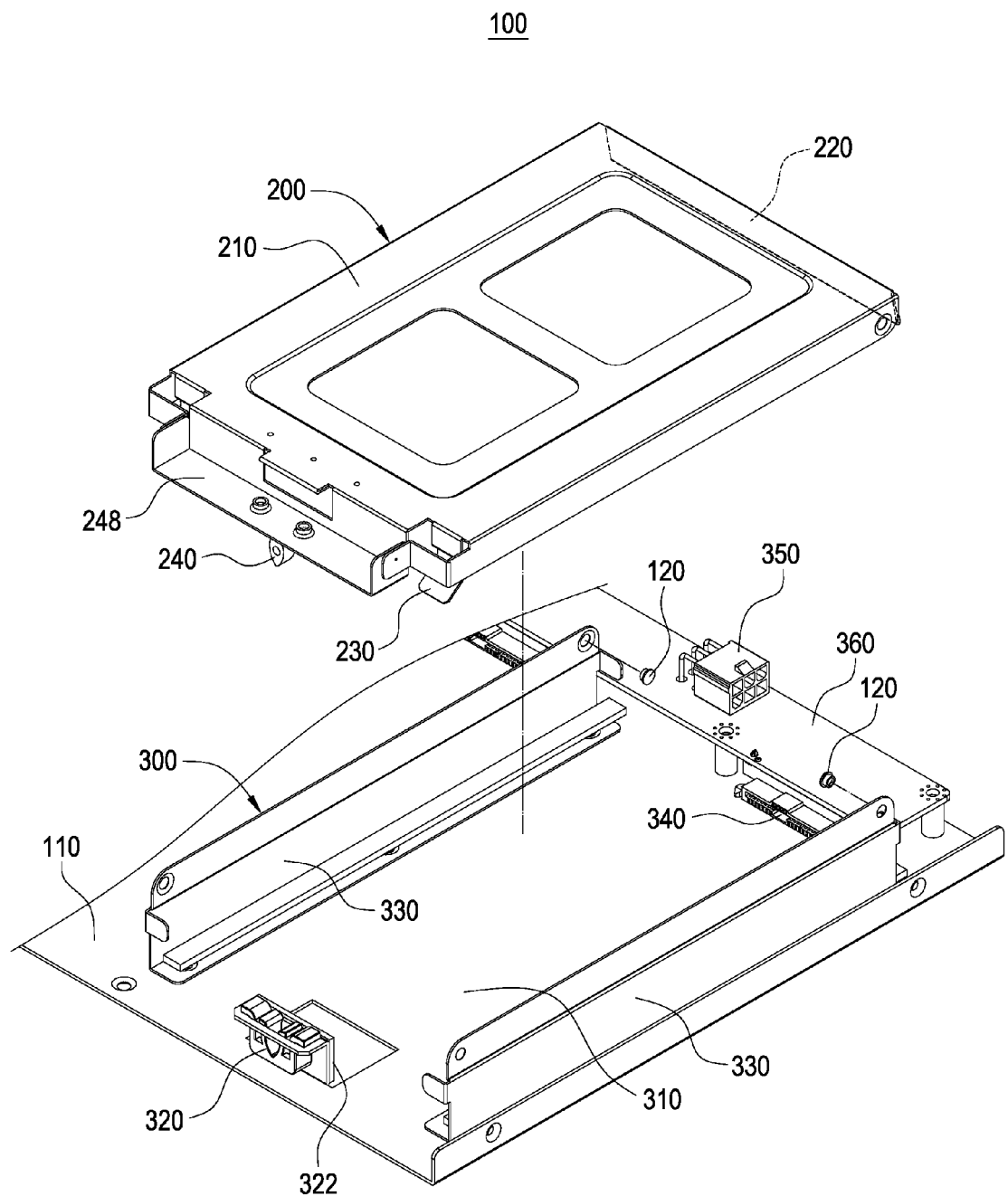
FIG. 1 is an exploded view showing the assembly structure for use in a storage media of server according to one embodiment of the present invention.
Figure 2:
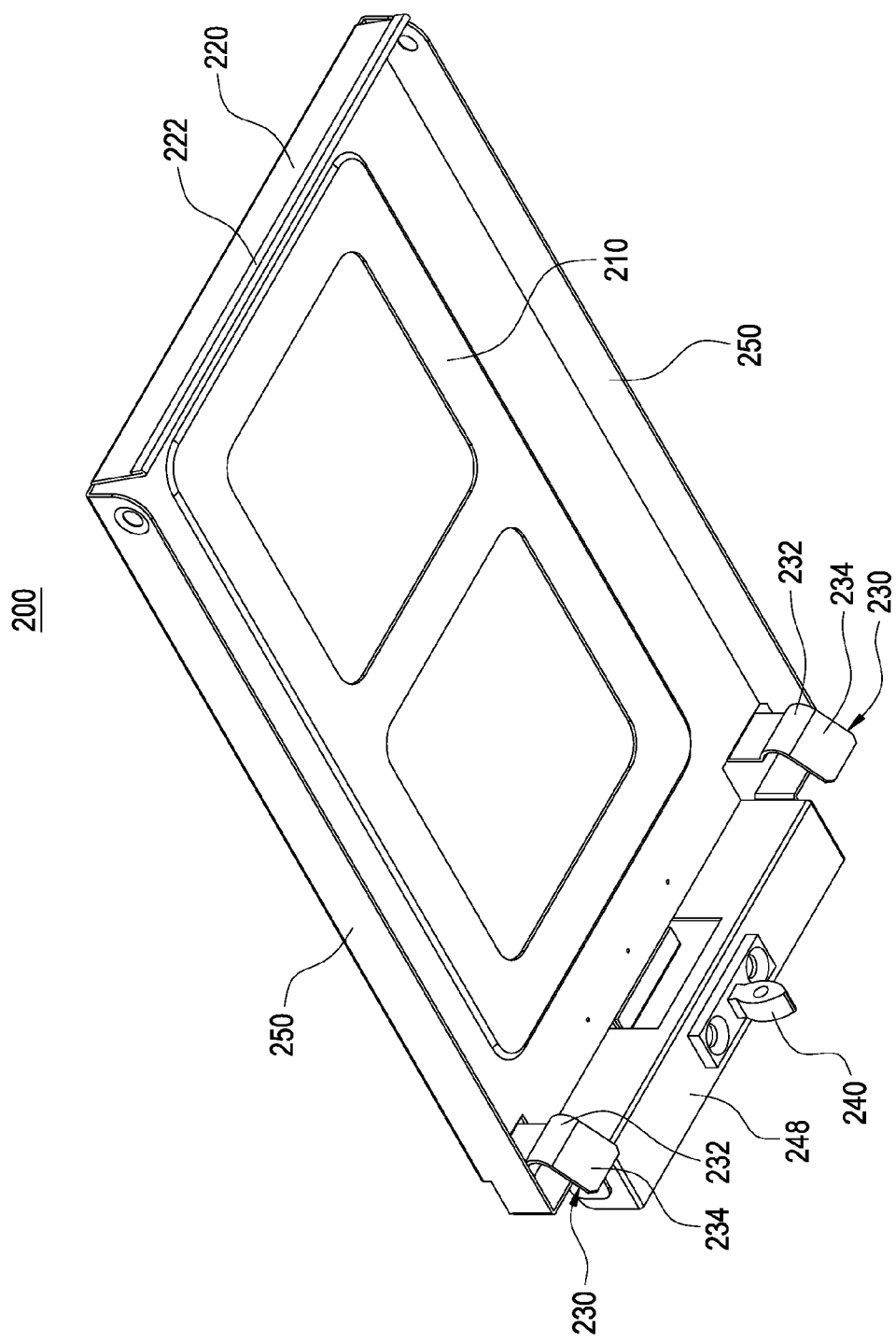
FIG. 2 is a perspective view showing the rotary cover plate according to one embodiment of the present invention.
Figure 3:
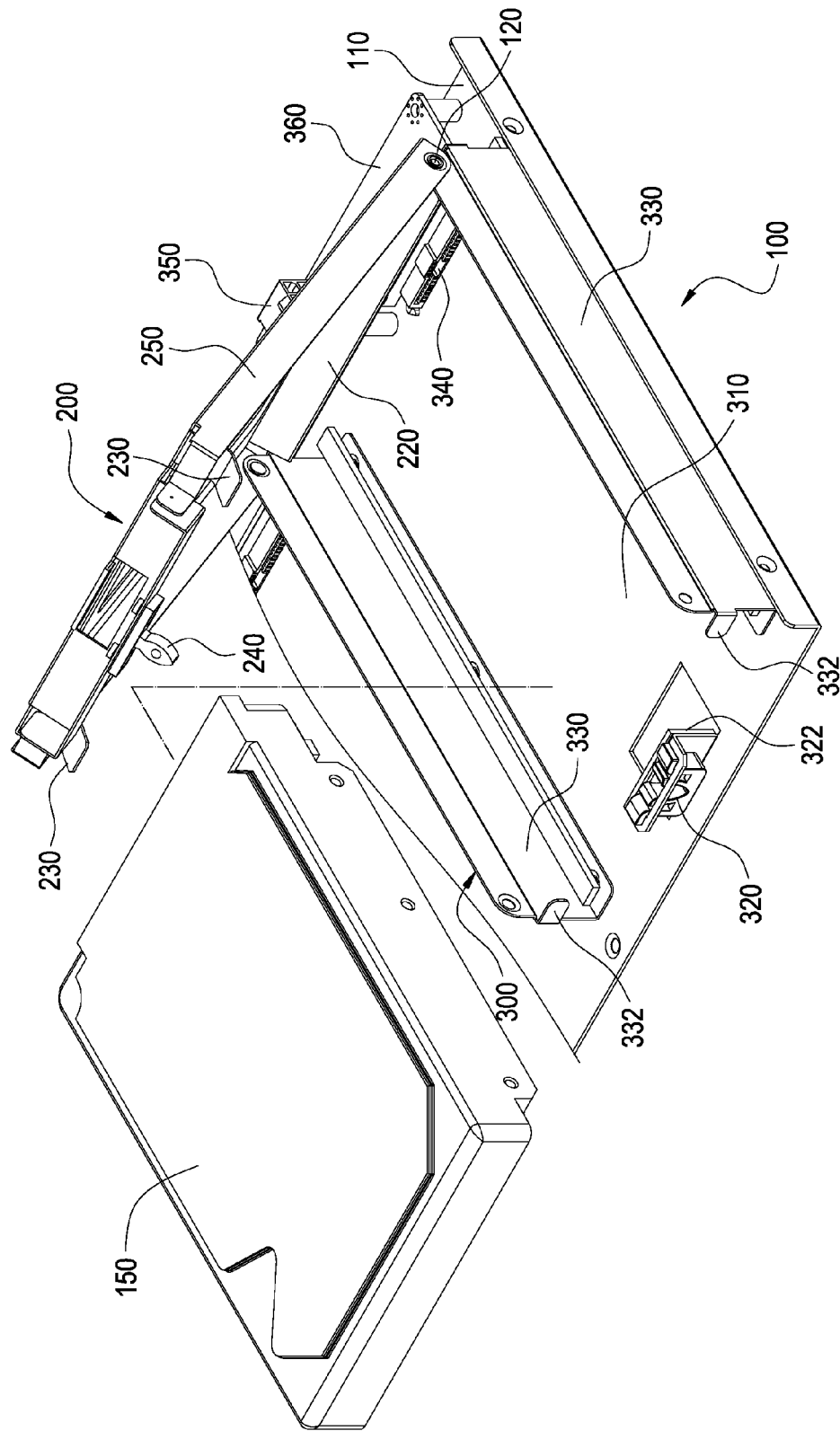
FIG. 3 is a schematic view showing the storage media being assembled according to one embodiment of the present invention.

Referring from FIG. 1 to FIG. 3, the present invention provides an assembly structure 100 for use in a storage media of server, which allows a storage media 150 to be assembled in or detached from a frame 110. As shown in figures, the storage media 150 is preferably to be, but not limited to, a hard disk drive. The assembly structure 100 includes a rotary cover plate 200 and a base 300. The base 300 is formed with an accommodation space 310 and installed on the frame 110 for accommodating the storage media 150.

As shown in FIG. 1 and FIG. 3, the base 300 further includes two first lateral plates 330, a base connector 340 and an external connector 350. The accommodation space 310 is defined by each of the first lateral plates 330 and the base connector 340. The base connector 340 is respectively and electrically connected to an insertion slot (not shown in figures) of the storage media 150 and the external connector 350. The base connector 340 is preferably to be a connector mated with the insertion slot of the storage media 150, for example: a SATA, USB, SAS (Serial Attached SCSI) or other suitable connection interface. The external connector 350 is electrically connected to the base connector 340 through a circuit board 360, and what shall be addressed is that the external connector 350 is not limited to any specific type.

One end of the rotary cover plate 200 is rotatably pivoted on the base 300. The rotary cover plate 200 includes a top plate 210, a push plate 220, a force plate 230 and two second lateral plates 250. The push plate 220 and the force plate 230 are oppositely arranged at two sides of the top plate 210. Each of the second lateral plates 250 is respectively arranged at another two sides of the top plate 210 opposite to the push plate 220 and the force plate 230, thereby enabling the rotary covert plate 200 to be formed in a substantially-rectangular cover member.

According to the embodiment disclosed in FIG. 1 and FIG. 3, two pivotal shafts 120 are further provided. Each of the second lateral plates 250 is oppositely arranged with each of the first lateral plates 330, wherein each of the pivotal shafts 120 is respectively connected to one end of each of the first lateral plates 330 and one end of each of the second lateral plates 250, thereby allowing the rotary cover plate 200 to rotate relative to the base 300 through the pivotal shaft 120 being served as a pivotal center.

In addition, another end of the rotary cover plate 200 opposite to the push plate 220 is further provided with a latch unit 240. The base 300 is further formed with an elastic latch slot 320 allowing the latch unit 240 to be latched. According to this embodiment, the elastic latch slot 320 is preferably to be a latch slot having elasticity. However, in other embodiments, the elastic latch slot 320 can also be formed as a push-push structure or other suitable structure. When the rotary cover plate 200 is engaged relative to the base 300, the latch unit 240 of the rotary cover plate 200 is able to be correspondingly latched with the elastic latch slot 320 of the base 300, thereby allowing the storage media 150 to be positioned and to form an electrical connection with the base 300. When the storage media 150 is desired to be taken out, a press plate 248 of the rotary cover plate 200 is pulled for allowing the latch unit 240 and the elastic latch slot 320 to be separated (please refer to FIG. 4).

According to this embodiment, a stop plate 322 extended from the frame 110 is further provided. One lateral surface of the stop plate 322 is used for limiting the displacement of the storage media 150 in the accommodation space 310, and another lateral surface thereof is adjacent to the elastic latch slot 320. In addition, one end of each of the first lateral plates 330 is formed with a stop piece 332, and each of the stop pieces 332 is arranged to be parallel to the stop plate 322 and used for the same purpose of limiting the displacement of the storage media 150 in the accommodation space 310.

As shown in FIG. 2, the push plate 220 of the rotary cover plate 200 is further formed with a folded part 222. The folded part 222 is preferably to be a folded structure formed through outwardly (or inwardly) folding one distal end of the push plate 220, thereby allowing the push plate 200 to be provided with a better structural strength and prevented from being deformed when pushing the storage media (not shown in figure). Two ends of the push plate 220 defined between the two second lateral plates 250 are respectively formed as a free end thereby being provided with a function of elastically abutting and pushing the storage media 150. In other words, two short sides of the push plate 220 are not connected to each of the second lateral plates 250, thereby enabling the push plate 220 to elastically abut and push the storage media 150. In addition, according to this embodiment, the force plate 230 is preferably to be integrally formed with the top cover 210 and extended to the accommodation space 310, and disposed adjacent to the latch unit 240. However, in another embodiment, the force plate 230 can be disposed at the same side as the press plate 248 of the latch unit 240, and can also be varied with respect to the dimension of the storage media, what shall be addressed is that the scope of the present invention is not limited to the above-mentioned arrangement.

Moreover, the force plate 230 is further formed with a bent part 232 and an extended part 234. The extended part 234 is connected to the bent part 232 and extended to the accommodation space 310. The quantity of the force plate 230 is preferably to be two, and the two force plates 230 are arranged in parallel. However, in another embodiment, the force plate 230 can also be formed in a single plate status or other status according to actual needs. The extended part 234 formed with an inclined plane is provided with a function of guiding the storage media 150 to be moved towards the interior of the base 300, and the bent part 232 having elasticity is provided with a function of physically abutting and pushing the storage media 150 for establishing the electrical connection with the base 300.

How to easily enable the storage media to be assembled on or detached from the base by utilizing the rotary cover plate without any tool is illustrated as following. Please refer from FIG. 4 to FIG. 6, when the rotary cover plate 200 is engaged relative to the base 300, the force plate 230 having the extended part 234 formed with the inclined plane is abutted against one end of the storage media 150. When the rotary cover plate 200 is further engaged towards the elastic latch slot 320, the contact point formed between the force plate 230 and the storage media 150 is gradually shifted from the extended part 234 to the bent part 232. In other words, during the engaging process, the bent part 232 is enabled to push the storage media 150 so as to finish the assembly.

Figure 5:
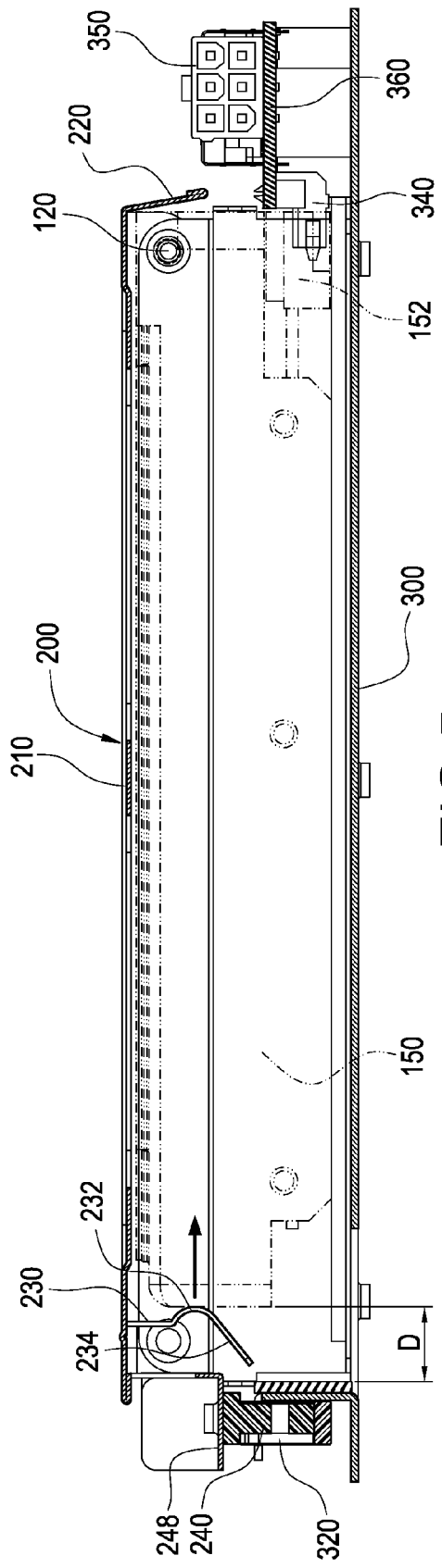
FIG. 5 is a side view showing the storage media shown in FIG. 4 already being assembled on the base, in other words the storage media being electrically connected to the base.
Figure 6:
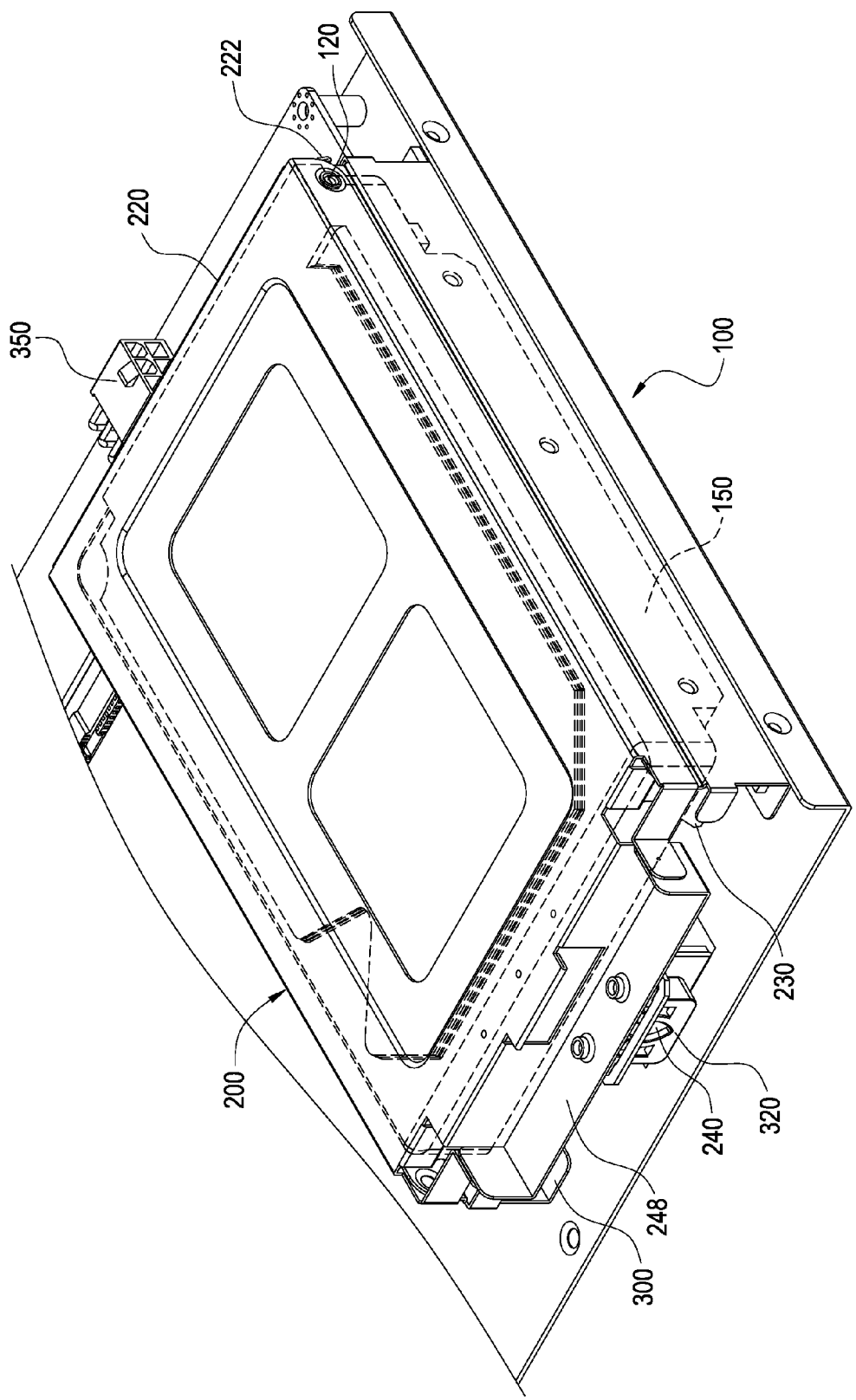
FIG. 6 is a perspective view of FIG. 5.

At the moment, in the downward-rotating force applied to the rotary cover plate 200, one component force thereof allows the force plate 230 (i.e. the bent part 232) to push the storage media 150 for being moved with a distance D in a direction parallel to the base 300 until an electrical connection is established between an insertion slot 152 of the storage media 150 and the base connector 340 of the base 300. Another component force perpendicular to the base 300 allows the latch unit 240 to be latched in the elastic latch slot 320, thereby achieving objectives of positioning the storage media 150 and electrically connecting the storage media 150 and the base 300, as shown in FIG. 5 and FIG. 6.

Figure 4:
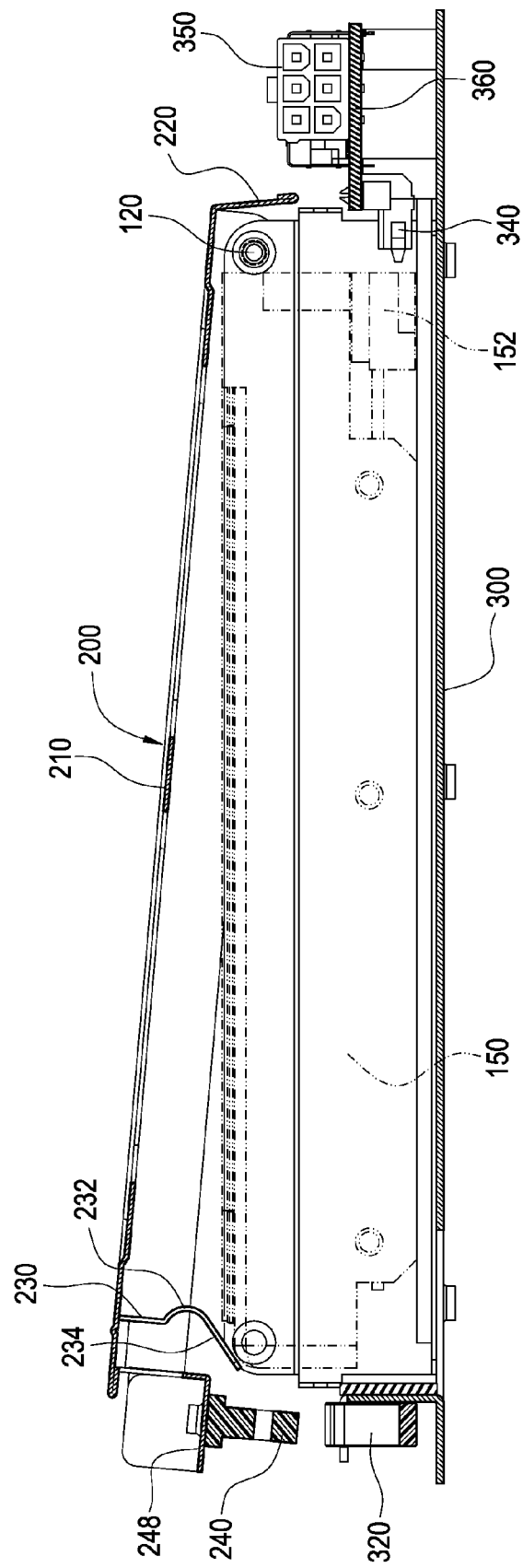
FIG. 4 is a side view showing the rotary cover plate being engaged relative to the base according to one embodiment of the present invention.
Figure 7:
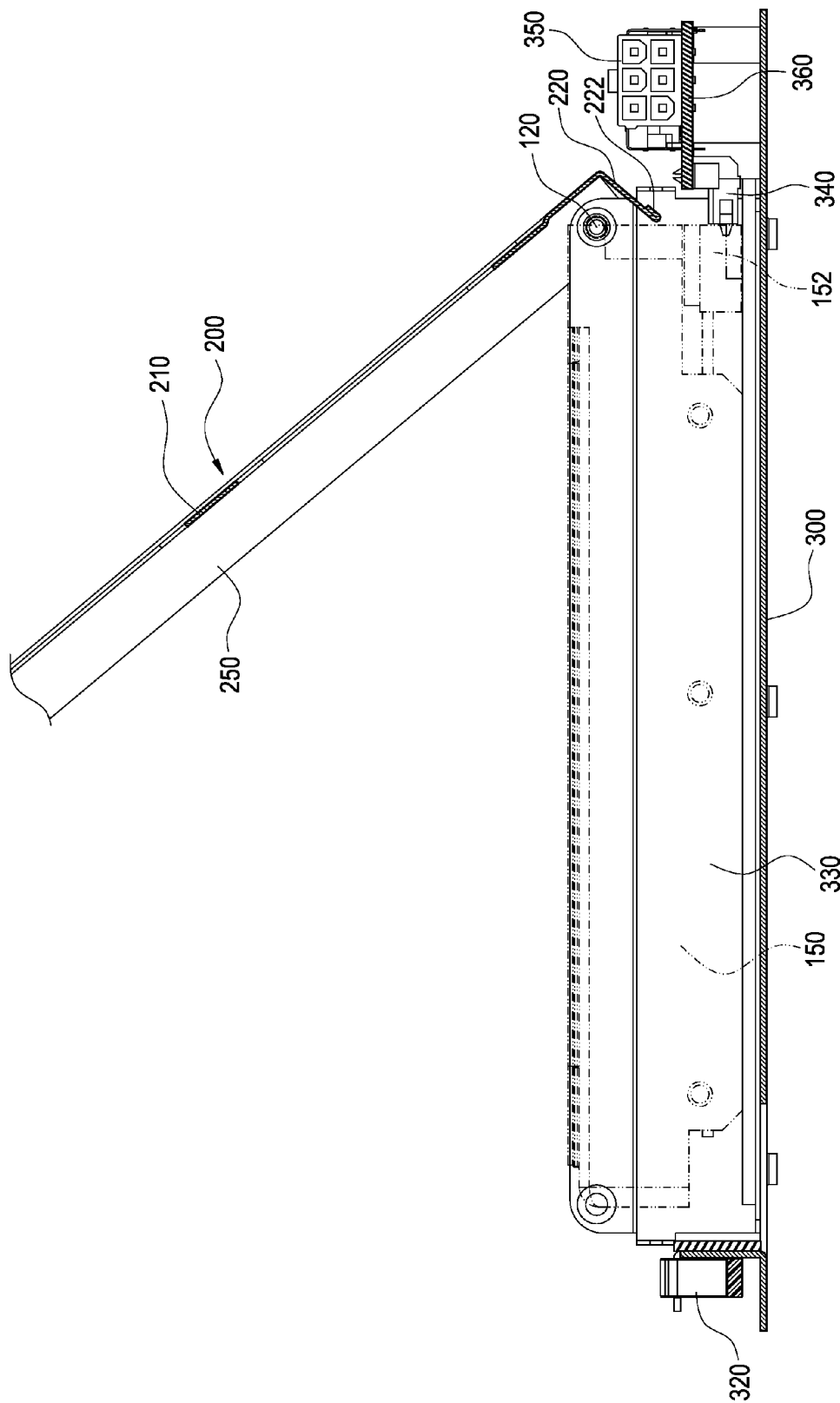
FIG. 7 is a side view showing the rotary cover plate being opened relative to the base according to one embodiment of the present invention.
Figure 8:
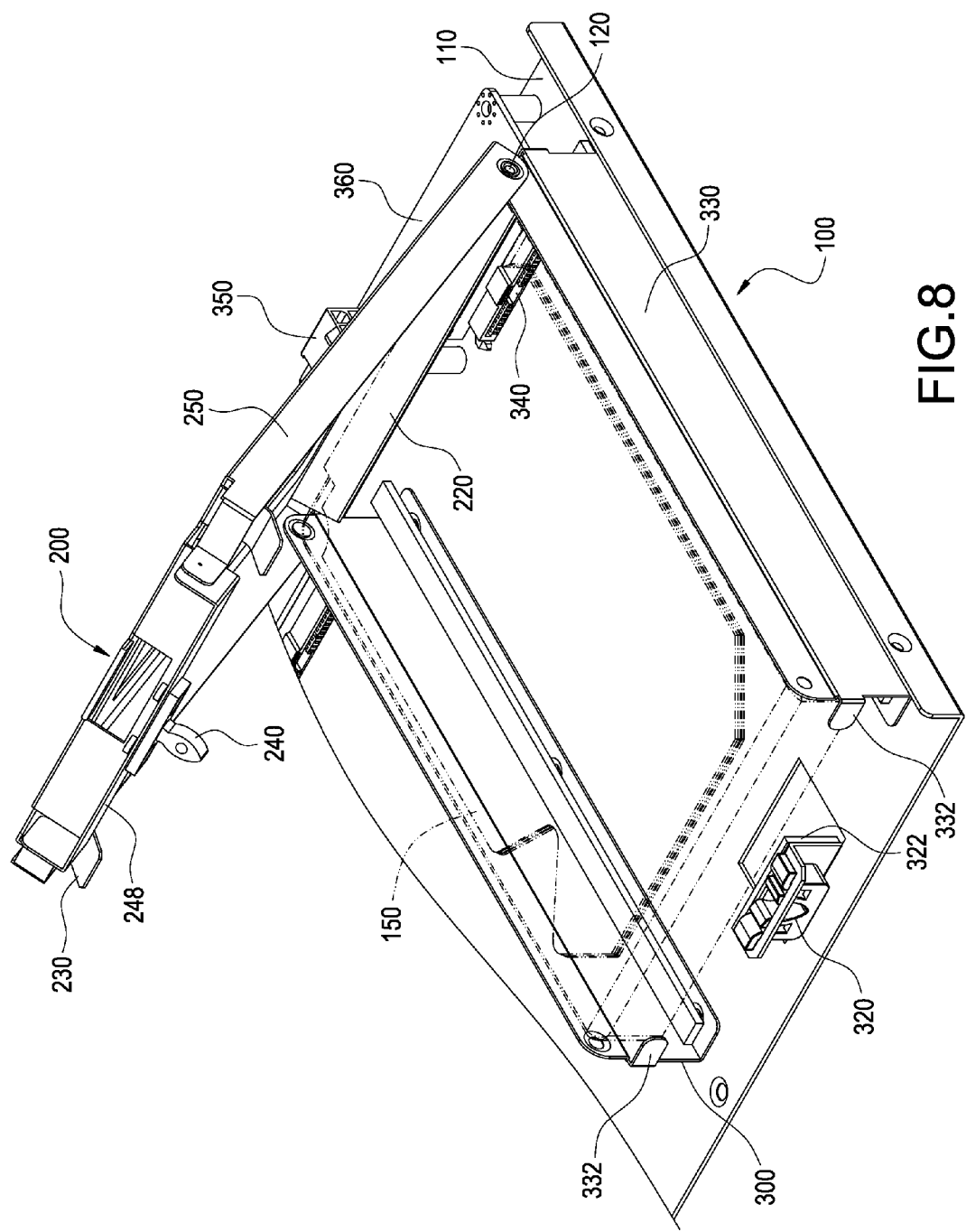
FIG. 8 is a perspective view of FIG. 7.

Please refer to FIG. 7 and FIG. 8, which are a side view and a perspective view showing the rotary cover plate being opened relative to the base according to one embodiment of the present invention. When the rotary cover plate 200 is desired to be opened relative to the base 300, the press plate 248 of the rotary cover plate 200 is pulled for allowing the latch unit 240 to be separated from the elastic latch slot 320 (or the latch unit 240 to be elastically retracted from the elastic latch slot 320). At this moment, the extended part 234 of the force plate 230 is in contact with one end of the storage media 150, but the insertion slot 152 of the storage media 150 and the base connector 340 are still electrically connected (as shown in FIG. 4).

As shown in FIG. 7, when the rotary cover plate 200 is further lifted to be away from the elastic latch slot 320, the push plate 200 is enabled to be abutted against the storage media 150. The higher the angle or the large the force generated during the rotary cover plate 200 being opened, the greater pushing force is provided by the push plate 220 to the storage media 150 until the storage media 150 is disconnected with the base connector 340. In other words, the electrical connection between the insertion slot 152 of the storage media 150 and the base connector 340 is no longer established, thereby allowing the storage media 150 to be taken out from the accommodation space 310 of the base 300. As shown in FIG. 8, because the length of the push plate 200 is greater than the length of the insertion slot (not shown in figure) and the base connector 340, and the push plate 220 is formed with the folded part 222, so when the push plate 220 is served to push the storage media 150, the push plate 220 is enabled to achieve the effect of pushing the storage media 150 and the push plate 220 is prevented from being deformed. Accordingly, by opening the rotary cover plate 200, the storage media 150 is able to be easily released from the base connector 340 of the base 300, thereby enabling the storage media 150 to be easily taken out.

Figure 9:
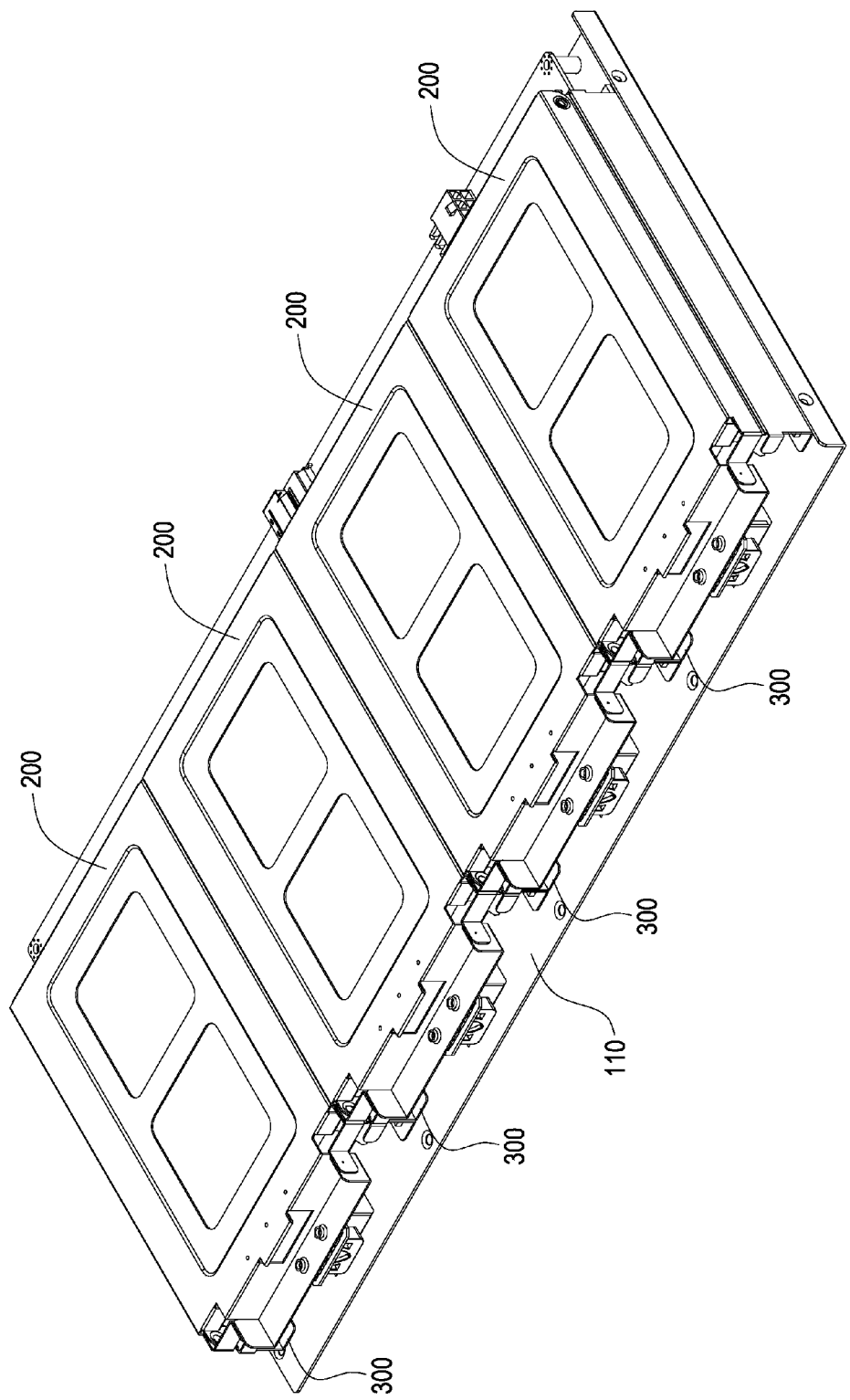
FIG. 9 is a schematic showing another embodiment of the present invention.

Please refer to FIG. 9, which is a schematic showing another embodiment of the present invention. The present invention further provides an assembly structure for use in a storage media of server, in which a frame 110 includes a plurality of bases 300 for allowing a plurality of storage medias (not shown in figure) to be assembled or detached. Because the structure, the components, the connection relation and the operation relation are the same as the previous embodiment, no further illustration is provided.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An assembly structure for use in a storage media of server, allowing a storage media to be assembled in or detaching from a frame and including:
   a base, formed with an accommodation space and installed on the frame for accommodating the storage media; and
   a rotary cover plate, one end thereof being rotatably pivoted on the base, and including a top plate, a push plate and a force plate, wherein the push plate and the force plate is oppositely arranged at two sides of the top plate;
   wherein the rotary cover plate is able to be engaged relative to the base thereby enabling the force plate to push the storage media for being electrically connected to the base; and the rotary cover plate is able to be opened relative to the base thereby enabling the push plate to push the storage media for being disconnected with the base.

2. The assembly structure for use in a storage media of server according to claim 1, wherein another end of the rotary cover plate opposite to the push plate is further provided with a latch unit, and the base is further formed with an elastic latch slot allowing the latch unit to be latched.

3. The assembly structure for use in a storage media of server according to claim 2, furthering including a stop plate, wherein one lateral surface of the stop plate is used for limiting the displacement of the storage media in the accommodation space and another lateral surface thereof is adjacent to the elastic latch slot.

4. The assembly structure for use in a storage media of server according to claim 1, wherein one end of the push plate is further formed with a folded part for abutting and pushing the storage media.

5. The assembly structure for use in a storage media of server according to claim 1, wherein the force plate is further formed with a bent part and an extended part; the extended part is connected to the bent part and provided with a function of guiding the storage media to be moved towards the interior of the base, and the bent part is provided with a function of elastically abutting and pushing the storage media.

6. The assembly structure for use in a storage media of server according to claim 5, wherein the bent part and the extended part of the force plate are extended from the top cover into the accommodation space.

7. The assembly structure for use in a storage media of server according to claim 1, wherein the base further includes two first lateral plates, a base connector and an external connector; the accommodation space is defined by each of the first lateral plates and the base connector, and the base connector is respectively and electrically connected to an insertion slot of the storage media and the external connector.

8. The assembly structure for use in a storage media of server according to claim 7, further including two pivotal shafts, and the rotary cover plate further including two second lateral plates, each of the second lateral plates being oppositely arranged with each of the first lateral plates, wherein each of the pivotal shafts is respectively connected to one end of each of the first lateral plates and one end of each of the second lateral plates, thereby allowing the rotary cover plate to rotate relative to the base through the pivotal shaft being served as a pivotal center.

9. The assembly structure for use in a storage media of server according to claim 7, wherein a circuit board is provided between the base connector and the external connector, and the circuit board is respectively and electrically connected to the base connector and the external connector.

10. The assembly structure for use in a storage media of server according to claim 1, wherein the rotary cover plate further includes two second lateral plates, and each of the second lateral plates is respectively arranged at another two sides of the top plate opposite to the push plate and the force plate.

* * * * *